(12) United States Patent
Nozaki

(10) Patent No.: US 7,162,871 B2
(45) Date of Patent: Jan. 16, 2007

(54) PUMP UNIT

(76) Inventor: Takeaki Nozaki, c/o Kanzaki Kokyukoki Mfg. Co., Ltd., 18-1, Inadera 2-Chome, Amagasaki-shi, Hyogo 661-0981 (JP)

( * ) Notice: Subject to any disclaimer, the term of this patent is extended or adjusted under 35 U.S.C. 154(b) by 0 days.

(21) Appl. No.: 11/269,642

(22) Filed: Nov. 9, 2005

(65) Prior Publication Data

US 2006/0104842 A1 May 18, 2006

(30) Foreign Application Priority Data

Nov. 16, 2004 (JP) ............................. 2004-331561

(51) Int. Cl.
*F16D 31/02* (2006.01)
(52) U.S. Cl. ...................................................... 60/486
(58) Field of Classification Search ................... 60/486
See application file for complete search history.

(56) References Cited

U.S. PATENT DOCUMENTS 3,074,296 A * 1/1963 Ebert ..................... 74/DIG. 2

6,425,244 B1 * 7/2002 Ohashi et al. ................. 60/486

FOREIGN PATENT DOCUMENTS

JP 2003-291674 10/2003

* cited by examiner

*Primary Examiner*—F. Daniel Lopez
(74) *Attorney, Agent, or Firm*—Sterne, Kessler, Goldstein & Fox P.L.L.C.

(57) ABSTRACT

There is provided a pump unit including: a pump shaft operatively connected to a driving source; a cylinder block rotatably driven by the pump shaft; a piston unit accommodated in the cylinder block in a slidable manner in an axial direction; a movable swash plate oscillatable on an operational axis perpendicular to the pump shaft, the movable swash plate defining a slide range of the piston unit in abutment against the piston unit; a transmission gear supported by the pump shaft in a relatively non-rotatable manner, the transmission gear being disposed in such a manner as to face to the movable swash plate; a driven member operatively driven by the transmission gear; and a pump case supporting the pump shaft and accommodating therein the cylinder block, the piston unit, the movable swash plate, the transmission gear and the driven member.

6 Claims, 9 Drawing Sheets

PUMP UNIT

BACKGROUND OF THE INVENTION

1. Field of the Invention

The present invention relates to a pump unit.

2. Related Art

In a pump unit which is configured such that rotational power from a driving source can be transmitted to an actuator via a pair of operating oil lines, it has been conventionally known that, in addition to a first hydraulic pump main body operatively connected to the driving source, there are provided a second hydraulic pump main body and a PTO clutch mechanism.

For example, Japanese Patent Application Laid-open No. 2003-291,674 has proposed a pump unit comprising: a first pump shaft operatively connected to a driving source; a first hydraulic pump main body rotatably driven by the first pump shaft; a second pump shaft operatively connected to the first pump shaft; a second hydraulic pump main body rotatably driven by the second pump shaft; a PTO shaft operatively connected to the first pump shaft; a PTO clutch mechanism interposed on a transmission path from the first pump shaft to the PTO shaft; and a pump case, which supports the first pump shaft, the second pump shaft and the PTO shaft, and further, accommodates therein the first hydraulic pump main body, the second hydraulic pump main body and the PTO clutch mechanism.

The above-described pump unit in the prior art has been configured such that a first transmission gear supported by the first pump shaft in a relatively non-rotatable manner, a second transmission gear supported by the second pump shaft in a relatively non-rotatable manner in a state operatively connected to the first transmission gear, and a PTO transmission gear non-rotatable relatively to a driving-side member of the PTO clutch mechanism in a state operatively connected to the first transmission gear are adapted to transmit power from the first pump shaft to the second pump shaft and the PTO clutch mechanism. Here, the compactness of the entire unit has been susceptible to improvement.

Specifically, in the case where the first and second hydraulic pump main bodies are of a variable displacement type, the first and second hydraulic pump main bodies are provided with movable swash plates, respectively, besides cylinder blocks rotatably driven by the corresponding pump shafts and piston units accommodated in a non-rotatable but axially slidable manner relatively to the cylinder blocks.

The movable swash plate can be oscillated on an operational axis perpendicular to the corresponding pump shaft by an outside operation in a state inserted around the corresponding pump shaft, such that a suction/discharge oil quantity of the cylinder block can be varied by changing a slide range of the corresponding piston unit according to an oscillation position of the swash plate.

In other words, in the case where the above-described hydraulic pump main body is of the variable displacement type, both of the movable swash plate and the transmission gear must be disposed on the corresponding pump shaft. In the configuration, the oscillation range of the movable swash plate has been secured by separating the transmission gear from the corresponding movable swash plate along the axial direction of the pump shaft in the above-described pump unit in the prior art. Therefore, the pump unit cannot be satisfactorily reduced in size in the axial direction of the pump shaft.

The present invention has been accomplished to solve the problems experienced by the above-described prior art.

Therefore, it is a principal object of the present invention to provide a pump unit which can be reduced in size as much as possible in the pump unit, in which a movable swash plate and a transmission gear are disposed on a pump shaft.

SUMMARY OF THE INVENTION

According to the present invention, there is provides a pump unit including: a pump shaft operatively connected to a driving source; a cylinder block rotatably driven by the pump shaft; a piston unit accommodated in the cylinder block in a slidable manner in an axial direction; a movable swash plate oscillatable on an operational axis perpendicular to the pump shaft, the movable swash plate defining a slide range of the piston unit in abutment against the piston unit; a transmission gear supported by the pump shaft in a relatively non-rotatable manner, the transmission gear being disposed in such a manner as to face to the movable swash plate; a driven member operatively driven by the transmission gear; and a pump case supporting the pump shaft and accommodating therein the cylinder block, the piston unit, the movable swash plate, the transmission gear and the driven member.

In the thus pump unit, the transmission gear has a recess in conformity with an oscillation trail of the movable swash plate at a surface facing to the movable swash plate.

With the above-described configuration, the transmission gear and the movable swash plate can be arranged in the proximity of each other in the axial direction of the pump shaft, while allowing the oscillating movement of the movable swash plate.

Thus, the pump unit as a whole can be reduced in size as much as possible.

According to the present invention, there is also provides a pump unit including: first and second pump shafts; first and second cylinder blocks rotatably driven by the first and second pump shafts, respectively; first and second piston units accommodated in the first and second cylinder blocks, respectively, in a slidable manner in an axial direction; first and second movable swash plates oscillatable on first and second operational axes perpendicular to the first and second pump shafts, respectively, the first and second movable swash plates defining slide ranges of the first and second piston units in abutment against the first and second piston units, respectively; a first transmission gear supported by the first pump shaft in a relatively non-rotatable manner, the first transmission gear being disposed in such a manner as to face to the first movable swash plate; a second transmission gear supported by the second pump shaft in a relatively non-rotatable manner in a state driven in synchronism with the first transmission gear, the second transmission gear being disposed in such a manner as to face to the second movable swash plate; and a pump case supporting the first and second pump shafts and accommodating therein the first and second cylinder blocks, the first and second piston units and the first and second transmission gears.

In the thus pump unit, each of the first and second transmission gears has a recess in conformity with an oscillation trail of each of the first and second movable swash plates at a surface facing to the corresponding movable swash plate.

With the above-described configuration, the corresponding transmission gear and the corresponding movable swash plate can be arranged in the proximity of each other in the axial direction of the corresponding pump shaft, while allowing the oscillating movement of the movable swash plate.

Thus, the pump unit as a whole can be reduced in size as much as possible.

For example, each of the first and second movable swash plates may be of a trunnion type.

In the configuration, preferably, the first transmission gear, the first movable swash plate, the first piston unit are arranged in order along the first pump shaft; and the second transmission gear, the second movable swash plate, the second piston unit are arranged in order along the second pump shaft.

Alternatively, each of the first and second movable swash plates may be of a cradle type.

In the configuration, the first transmission gear is interposed between the first movable swash plate and the first piston unit in the axial direction of the first pump shaft; and the second transmission gear is interposed between the second movable swash plate and the second piston unit in the axial direction of the second pump shaft.

Furthermore, each of the first and second transmission gears has a through hole, into which the corresponding piston unit can be inserted.

Preferably, the pump case includes: a case main body having an opening, into which each of the first and second cylinder blocks can be inserted; and a plate member detachably connected to the case main body in such a manner as to liquid-tightly close the opening, the plate member has a, suction/discharge oil passage to be fluidly communicated with the cylinder block. The pump case has a swash plate receiving portion at an end surface on a side opposite to the opening.

In the above various configurations, preferably, each of the first and second pump shafts projects outward from the pump case at both ends thereof. One of the ends forms an input end operatively connected to a driving source while the residual end form an output ends for driving driven members.

BRIEF DESCRIPTION OF THE DRAWINGS

The above, and other objects, features and advantages of the present invention will become apparent from the detailed description thereof in conjunction with the accompanying drawings wherein.

DETAILED DESCRIPTION OF THE PREFERRED EMBODIMENTS

First Embodiment

Hereinafter, a description will be given of a pump unit in a preferred embodiment according to the present invention in reference to the accompanying drawings.

Figure 1:
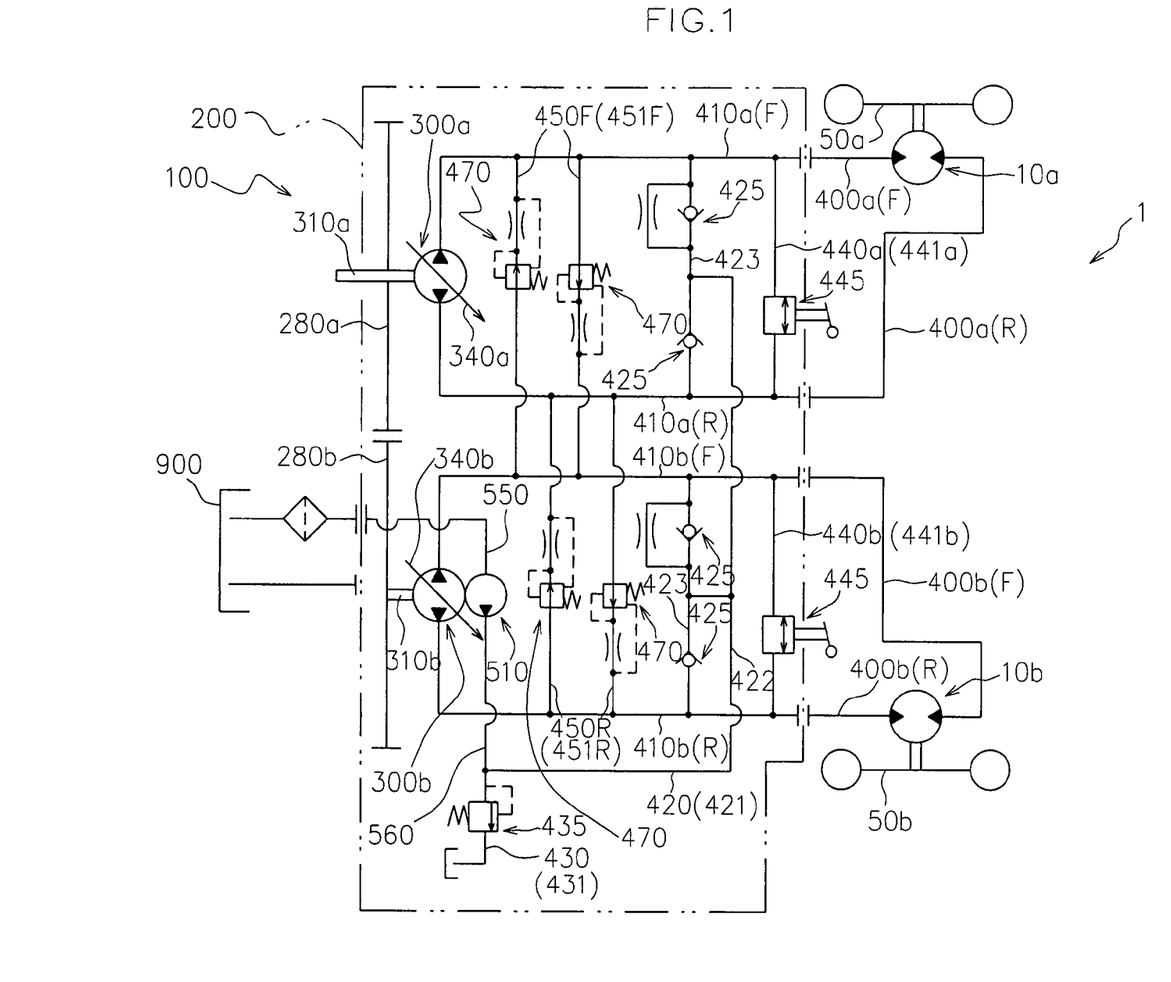
FIG. 1 is a hydraulic circuit diagram of a working vehicle, to which a pump unit of a first embodiment of the present invention is applied.
Figure 2:
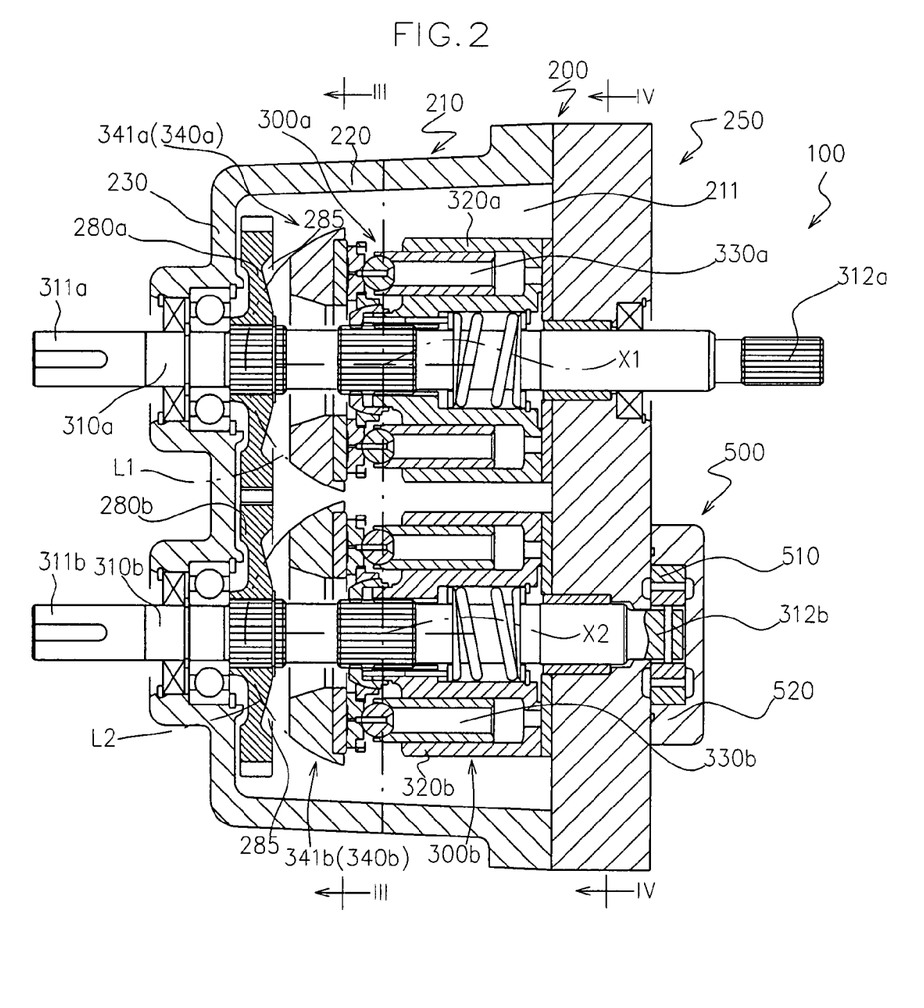
FIG. 2 is a laterally plan view of the pump unit of the first embodiment of the present invention.
Figure 3:
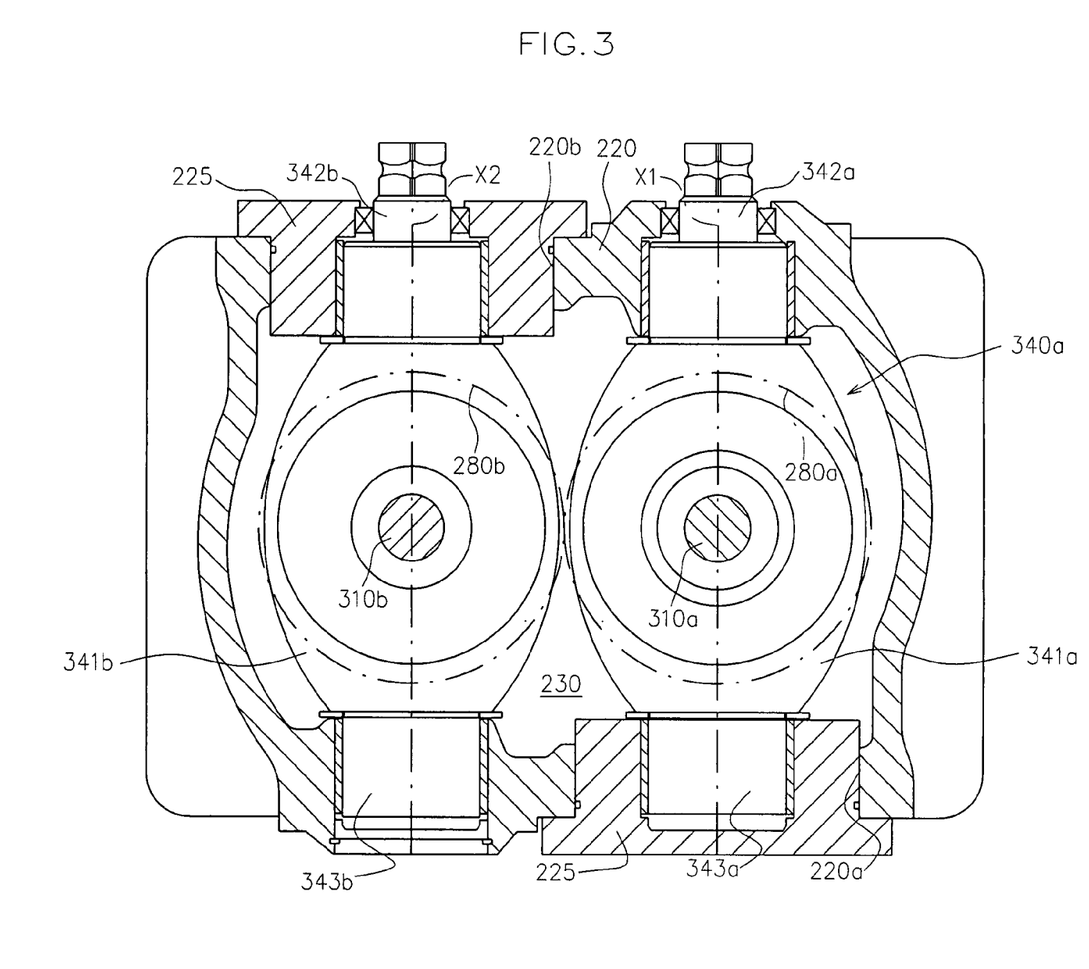
FIG. 3 is a vertically cross-sectional view of the pump unit, taken along a line III—III of FIG. 2.

FIG. 1 is a hydraulic circuit diagram illustrating a working vehicle 1, to which a pump unit 100 in the present preferred embodiment is applied. FIG. 2 is a laterally plan view of the pump unit. Further, FIG. 3 is a vertically cross-sectional view showing the pump unit, taken along a line III—III of FIG. 2.

As illustrated in FIG. 1, the pump unit 100 forms a part of a traveling-system transmission mechanism of the working vehicle 1.

Specifically, the working vehicle 1 is provided with a driving source, not illustrated, the pump unit 100 according to the present embodiment operatively connected to the driving source in the present preferred embodiment, a pair of first and second drive wheels 50a and 50b, a first hydraulic motor unit 10a for driving the first drive wheel 50a, and a second hydraulic motor unit 10b for driving the second drive wheel 50b. The pump unit 100 and the first and second hydraulic motor units 10a and 10b form a pair of right and left HSTs, which are independent of each other.

Incidentally, the first and second hydraulic motor units 10a and 10b, each of which is provided with a deceleration gear, a brake and an axle including a hub on which a wheel rim is mounted. The first and second hydraulic motor units 10a and 10b are mounted to a vehicle frame in the vicinity of the first and second drive wheels 50a and 50b, respectively.

In particular, the pump unit 100 includes a pair of first and second hydraulic pump main bodies 300a and 300b, and is placed at a position, at which the pump unit 100 can be readily connected to the driving source.

Each of the pair of first and second hydraulic pump main bodies 300a and 300b is of a variable displacement type.

The first hydraulic pump main body 300a is fluidly connected to a first hydraulic motor main body via a pair of first operating lines 400a in such a manner as to form a first HST in cooperation with the first hydraulic motor main body in the first hydraulic motor unit 10a. The second hydraulic pump main body 300b is fluidly connected to a second hydraulic motor main body via a pair of second operating lines 400b in such a manner as to form a second HST in cooperation with the second hydraulic motor main body in the second hydraulic motor unit 10b.

Specifically, as shown in FIGS. 2 and 3, the pump unit 100 includes: first and second pump shafts 310a and 310b; the first and second hydraulic pump main bodies 300a and 300b rotatably driven by the first and second pump shafts 310a and 310b, respectively; first and second movable swash plates 340a and 340b capable of varying suction/discharge oil quantities of the first and second hydraulic pump main bodies 300a and 300b according to an outside operation, respectively; a first transmission gear 280a supported by the first pump shaft 310a in a relatively non-rotatable manner; a second transmission gear 280b supported by the second pump shaft 310b in a relatively non-rotatable manner so as to rotate the second pump shaft 310b in synchronism with the first pump shaft 310a; and a pump case 200 for supporting the first and second pump shafts 310a and 310b and accommodating therein the first and second hydraulic pump main bodies 300a and 300b and the first and second transmission gears 280a and 280b.

In the present preferred embodiment, as shown in FIG. 2, the pump case 200 includes, at one end thereof, a case main body 210 having an opening 211, into which the first and second hydraulic pump main bodies 300a and 300b and the first and second transmission gears 280a and 280b can be inserted, and a plate member (i.e., a center section) 250 detachably connected to the case main body 210 so as to close the opening 221.

The case main body 210 integrally includes a peripheral wall 220 surrounding the first and second hydraulic pump main bodies 300a and 300b and the first and second transmission gears 280a and 280b, and an end wall 230 for closing one end of the peripheral wall 220. The other end of the peripheral wall 220 serves as the opening 211.

Figure 4:
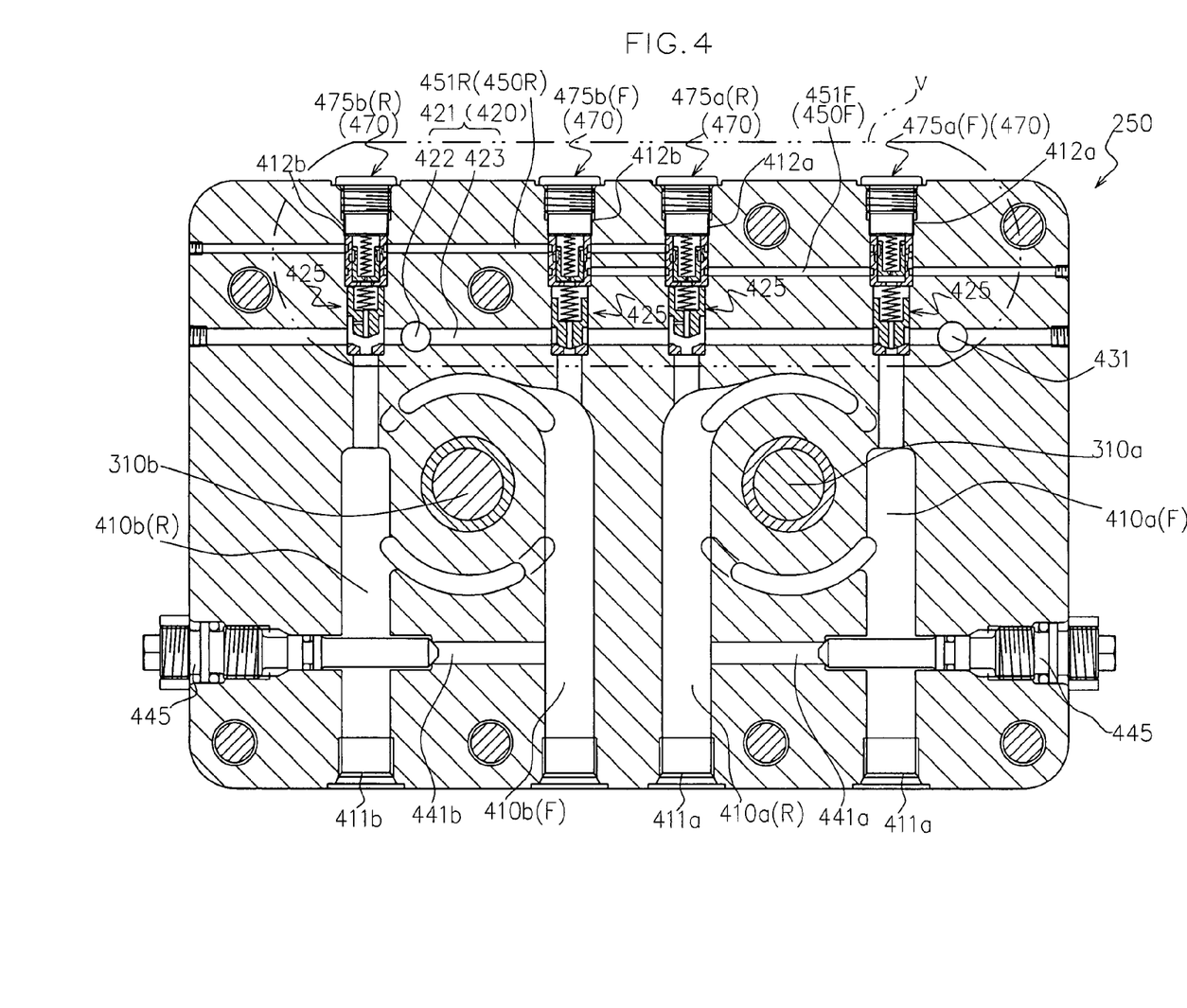
FIG. 4 is a vertically cross-sectional view of a plate member, taken along a line IV—IV of FIG. 2.

FIG. 4 is a vertically cross-sectional view of the plate member 250, taken along a line IV—IV of FIG. 2.

As shown in FIG. 4, the plate member 250 includes a pair of first and second operating oil passages 410a and 410b partly which form parts of the, pair of first and second operating lines 400a and 400b, respectively, and further, is configured in such a manner as to close the opening in a state fluidly connected to the first and second hydraulic pump main bodies.

Incidentally, the details of the oil passages in the plate member 250 will be described later.

The first and second pump shafts 310a and 310b are supported by the pump case 200.

In the present preferred embodiment, as shown in FIGS. 2 and 3, each of the first and second pump shafts 310a and 310b is supported at both ends thereof by the end wall 230 and the plate member 250 of the case main body 210 in a state in which both ends thereof project outward.

Particularly, one end 311a of the first pump shaft 310a forms an input end operatively connected to the driving source. The other end 312a of the first pump shaft 310a and one end 311b and the other end 312b of the second pump shaft 310b could form output ends for driving members to be driven such as a charge pump unit and a cooling fan.

Incidentally, as shown in FIGS. 1 to 3, the pump unit 100 in the present preferred embodiment includes a charge pump unit 500 to be driven by the other end 312b of the second pump shaft 310b in addition to the above-described configuration.

The charge pump unit 500 is provided with a charge pump main body 510 to be driven by the other end 312b of the second pump shaft 310b and a charge pump case 520 to be connected to the outer surface of the plate member 250 in such a manner as to surround the charge pump main body 510.

The second pump shaft 310b is designed to be rotated in synchronism with the first pump shaft 310a by the use of the first and second transmission gears 280a and 280b.

As described above, the first end 311a of the first pump shaft 310a is designed to be operatively connected to the driving source in the present preferred embodiment.

Furthermore, the first transmission gear 280a, which is supported by the first pump shaft 310a in the relatively non-rotatable manner, meshes directly with the second transmission gear 280b, which is supported by the second pump shaft 310b in the relatively non-rotatable manner.

In place of the above-described configuration, an idle gear may be interposed between the first and second transmission gears 280a and 280b.

Otherwise, there may be provided an input shaft independently of the first and second pump shafts 310a and 310b.

In other words, the pump unit 100 may be provided with an input shaft having at least one end projecting outward and an input gear supported by the input shaft in a relatively non-rotatable manner, wherein the first and second transmission gears 280a and 280b may be connected in series or in parallel to the input gear.

The first hydraulic pump main body 300a includes a first cylinder block 320a supported by the first pump shaft 310a in the relatively non-rotatable manner in such a manner as to be rotatably driven by the first pump shaft 310a, and a first piston unit 330a accommodated inside of the first cylinder block 320a in a slidable manner in an axial direction of the first pump shaft 310a.

Here, the second hydraulic pump main body 300b has substantially the same configuration as that of the first hydraulic pump main body 300a.

As to the second hydraulic pump main body 300b, reference character a designating the component elements in the first hydraulic pump main body 300a is replaced by b, and therefore, the detailed description will be appropriately omitted below.

The first movable swash plate 340a can be oscillated on a first operational axis X1 (see FIG. 3) perpendicular to the corresponding first pump shaft 310a, thereby defining the slide range of the first piston unit 330a according to its own oscillation position, so as to vary a suction/discharge oil quantity of the first hydraulic pump main body 300a.

In the same manner, the second movable swash plate 340b can be oscillated on a second operational axis X2 (see FIG. 3) perpendicular to the corresponding second pump shaft 310b, thereby defining the slide range of the second piston unit 330b according to its own oscillation position, so as to vary a suction/discharge oil quantity of the second hydraulic pump main body 300b.

As shown in FIGS. 2 and 3, each of the first and second movable swash plates 340a and 340b is of a trunnion type supported on both ends thereof by the pump case 200 in the present preferred embodiment.

More particularly, the first movable swash plate 340a integrally includes: a swash plate portion 341a inserted around the first pump shaft in such a manner that one end surface forms an abutment surface in abutment against the first piston unit 330a; an operating shaft portion 342a supported by the peripheral wall 220 of the case main body 210 in the relatively rotatable manner on an axis in such a manner as to be positioned on the first operational axis X1 and extend outward at the outer end thereof, and a base end shaft portion 343a supported by the peripheral wall 220 of the case main body 210 in the relatively rotatable manner on an axis in such a manner as to be opposite to the operating shaft portion 342a in reference to the swash plate portion 341a on the first operational axis X1, wherein the swash plate portion 341a is designed to be oscillated on the first operational axis X1 by rotating the operating shaft portion 342a on the axis.

In the same manner, the second movable swash plate 340b integrally includes: a swash plate portion 341b inserted around the second pump shaft 310b in such a manner that one end forms an abutment surface in abutment against the second piston unit 330b; an operating shaft portion 342b supported by the peripheral wall 220 of the case main body 210 in the relatively rotatable manner on an axis in such a manner as to be positioned on the second operational axis X2 and extend outward at the outer end thereof, and a base end shaft portion 343b supported by the peripheral wall 220 of the case main body 210 in the relatively rotatable manner on an axis in such a manner as to be opposite to the operating shaft portion 342b in reference to the swash plate portion 341b on the second operational axis X2, wherein the swash plate portion 341b is designed to be oscillated on the second operational axis X2 by rotating the operating shaft portion 342b on the axis.

As shown in FIG. 3, in the present preferred embodiment, a first opening 220a for allowing the first movable swash plate 340a to be inserted inside of the pump case 200 is formed on the peripheral wall 220 of the case main body 210 at one side in the direction of the first operational axis X1 in reference to the first pump shaft 310a. Also, a second orifice 220b for allowing the second movable swash plate 340b to be inserted inside of the pump case 200 is formed on the peripheral wall 220 of the case main body 210 at the other side in the direction of the second operational axis X2 in reference to the second pump shaft 310b. According to this configuration, a distance between the first and second pump shafts 310a and 310b could be reduced as much as possible, thereby reducing the size of the pump case 200.

Incidentally, in FIG. 3, reference numeral 225 designates a closing member for supporting the corresponding shaft portion 343a or 342b in a relatively rotatable manner on the axis while closing each of the first and second openings 220a and 220b.

Moreover, the pump unit 100 in the present preferred embodiment is configured, as described below, such that the first transmission gear 280a and the first movable swash plate 340a are made to approach each other as possible in the axial direction of the first pump shaft 310a, and further, the second transmission gear 280b and the second movable swash plate 340b are made to approach each other as possible in the axial direction of the second pump shaft 310b.

That is to say, as shown in FIG. 2, in the pump unit 100 in the present preferred embodiment provided with trunnion type swash plates as the first and second movable swash plates 340a and 340b, the first transmission gear 280a is mounted on the first pump shaft 310a in such a manner as to face to a reverse surface opposite to the abutment surface of the swash plate portion 341a in the first movable swash plate 340a, and further, the second transmission gear 280b is mounted on the second pump shaft 310b in such a manner as to face to a reverse surface opposite to the abutment surface of the swash plate portion 341b in the second movable swash plate 340b.

With the above-described configuration, each of the first and second transmission gears 280a and 280b has a recess 285 in conformity with the oscillation trail of each of the swash plates 341a and 341b at a surface facing to the corresponding swash plate 341a or 341b.

By forming the recesses 285 in conformity with the oscillation trails of the movable swash plates 340a and 340b at the surfaces facing to the movable swash plates 340a and 340b in the first and second transmission gears 280 as described above, the corresponding movable swash plates 340a and 340b and transmission gears 280a and 280b can be proximally disposed in the axial direction of the pump shafts 310a and 310b while allowing the oscillation of the movable swash plates 340a and 340b, thereby reducing the size of the pump unit 100 as much as possible.

Here, if the reverse surfaces of the swash plate portions 341a and 341b of the first and second movable swash plates 340a and 340b, respectively, are formed into arcuate shape in reference to the corresponding operational axes X1 and X2 (indicated by chain double-dashed lines L1 and L2 in FIG. 2), the oscillation trails of the reverse surfaces, as viewed along the operational axes X1 and X2, can be made to accord with the arches L1 and L2, thereby preventing the reverse surfaces from approaching or contacting the corresponding transmission gears 280a and 280b caused by the oscillation of the first and second movable swash plates 340a and 340b.

However, the maximum thickness of each of the swash plate portions 341a and 341b becomes large in the above-described configuration, and therefore, each of the swash plate portions 341a and 341b and the corresponding transmission gear 280a or 280b must be separated by a distance according to the arch.

In contrast, in the present preferred embodiment, the swash plate portions 341a and 341b of the movable swash plates 340a and 340b are configured such that at least a part of each of the reverse surfaces becomes parallel to the abutment surface, so that the maximum thickness of each of the swash plate portions 341a and 341b can be reduced less than the maximum thickness defined by each of the arcuate reverse surfaces L1 and L2, and further, the recesses 285 can prevent any interference between the swash plate portions 341a and 341b and the transmission gears 280a and 280b during the oscillation.

Now, explanation will be made below on a hydraulic circuit of the pump unit 100.

As shown in FIG. 1, the pump unit 100 is provided with: a suction line 550, which is fluidly connected at one end thereof to an oil sump (i.e., an exterior oil tank 900 in the present preferred embodiment) and is fluidly connected at the other end thereof to a suction port of the auxiliary pump unit 510; a discharge line 560, which is fluidly connected to a discharge port of the auxiliary pump unit 510; a charge line 420 for supplying pressurized oil from the discharge line 560 to the pair of first operating oil lines 400a and the pair of second operating oil lines 400b via check valves 425, respectively; and a charge relief line 430, on which a charge relief valve 435 for setting an oil pressure on the charge line 420 is interposed.

As shown in FIG. 1, it is preferable that the pump unit 100 should include: a first bypass line 440a for connecting the pair of first operating oil lines 400a to each other, the first bypass line 440a having a switch valve 445 for connecting or disconnecting the first bypass line 440a interposed thereon; and a second bypass line 440b for connecting the pair of second operating oil lines 400b to each other, the second bypass line 440b having another switch valve 445 for connecting or disconnecting the second bypass line 440b interposed thereon.

With the above-described first and second bypass lines 440a and 440b, a difference in oil pressure can be prevented from occurring between the pair of first operating oil lines 400a and between the pair of second operating oil lines 400b when a vehicle is forcibly towed in the case of an engine trouble or the like.

As shown in FIG. 1, it is much preferable that the pump unit 100 should include: forward-side straight stable lines 450F for connecting a first operating oil line 400a(F) on a high pressure side during a forward travel, at which a pressure becomes high during the forward travel, out of the pair of first operating oil lines 400a, to a second operating oil line 400b(F) on a high pressure side during a forward travel, at which a pressure becomes high during the forward travel, out of the pair of second operating oil lines 400b via a constant flow rate orifice mechanism 470; and rearward-side straight stable lines 450R for connecting a first operating oil line 400a(R) on a high pressure side during a rearward travel, at which a pressure becomes high during the rearward travel, out of the pair of first operating oil lines 400a, to a second operating oil line 400b(R) on a high pressure side during a rearward travel, at which a pressure becomes high during the rearward travel, out of the pair of second operating oil lines 400b via another constant flow rate orifice mechanism 470.

With the above-described forward-side straight stable lines 450F and rearward-side straight stable lines 450R, it is possible to effectively prevent or reduce the generation of a wandering phenomenon, in which a vehicle wanders in spite of operation of output adjusting members (i.e., the first and second movable swash plates 340a and 340b) of the first and second HSTs in such a manner as to turn the first and second HSTs into the same output state, while effectively maintaining the independent transmission of the first and second HSTs.

Incidentally, the function of each of the forward-side straight stable lines 450F and the rearward-side straight stable lines 450R will be described later.

Next, a description will be given below of a specific configuration of each of the hydraulic lines.

As shown in FIGS. 2 to 4, the center section 360 includes the pair of first operating oil passages 410a forming a part of the pair of first operating oil lines 400a, the pair of second operating oil passages 410b forming a part of the pair of second operating oil lines 400b, a charge oil passage 421 forming the charge line 420, a charge relief oil passage 431 forming a part of the charge relief line 430, first and second bypass oil passages 441a and 441b forming the first and second bypass lines 440a and 440b, respectively, forward-side straight stable oil passages 451F forming the forward-side straight stable lines 450F, and rearward-side straight stable oil passages 451R forming the rearward-side straight stable lines 450R.

As shown in FIG. 4, each of the pair of first operating oil passages 410a includes a kidney port serving as a fluid connecting port to the corresponding first hydraulic pump main body 300a, and an operating oil port 411a, which is opened to an outer surface and serves as a fluid connecting port to the first hydraulic motor unit 10a.

As shown in FIG. 4, in the present preferred embodiment, the pair of first operating oil passages 410a extend substantially in parallel to each other with the corresponding first pump shaft 310a held therebetween in such a manner that one end and the other end are opened to the outer surface, wherein the one end defines the operating oil port 411a, and further, a center portion between the one end and the other end defines the kidney port.

Here, the other end of each of the pair of first operating oil passages 410a defines a mounting hole 412a, in which the check valve 425 and a constant flow rate valve 475 forming the orifice mechanism 470 are disposed.

In particular, the check valve 425 and a first forward-side constant flow rate valve 475(F) are disposed in the mounting hole 412a defined by the, first operating oil passage 410a(F) on the high pressure side during the forward travel. The check valve 425 and a rearward-side first constant flow rate valve 475(R) are disposed in the mounting hole 412a defined by the first operating oil passage 410a(R) on the high pressure side during the forward travel.

The pair of second operating oil passages 410b are formed substantially in parallel to the pair of first operating oil passages 410a.

The pair of second operating oil passages 410b are configured in substantially the same manner as the pair of first operating oil passages 410a except that the pair of second operating oil passages 410b are arranged in such a manner as to have the corresponding second pump shaft 310b interposed therebetween. Therefore, as to the pair of second operating oil passages 410b, reference character "a" designating the component elements in the first operating oil passage 410a is replaced by "b", and therefore, the detailed description will be appropriately omitted below.

The charge oil passage 421 includes a branch oil passage 423 extending in a direction perpendicular to the pair of first operating oil passages 410a and the pair of second operating oil passages 410b so as to communicate the pair of first operating oil passages 410a and the pair of second operating oil passages 410b with each other at the other ends, respectively (that is, on a side opposite to the first and second operating oil ports 411a and 411b in reference to the first and second pump shafts 310a and 310b and on a side, on which the mounting holes 412a and 412b are formed). The charge oil passage 421 further includes a common oil passage 422 having one end opened to a surface facing to the charge pump case 520 so as to define the charge port and the other end communicating with the branch oil passage 423.

Thus, the check valve 425 is inserted into each of the mounting holes 412a and 412b so as to connect or disconnect the branch oil passage 423 of the charge oil passage 421 to or from each of the pair of first operating oil passages 410a and each of the pair of second operating oil passages 410b.

Figure 5:
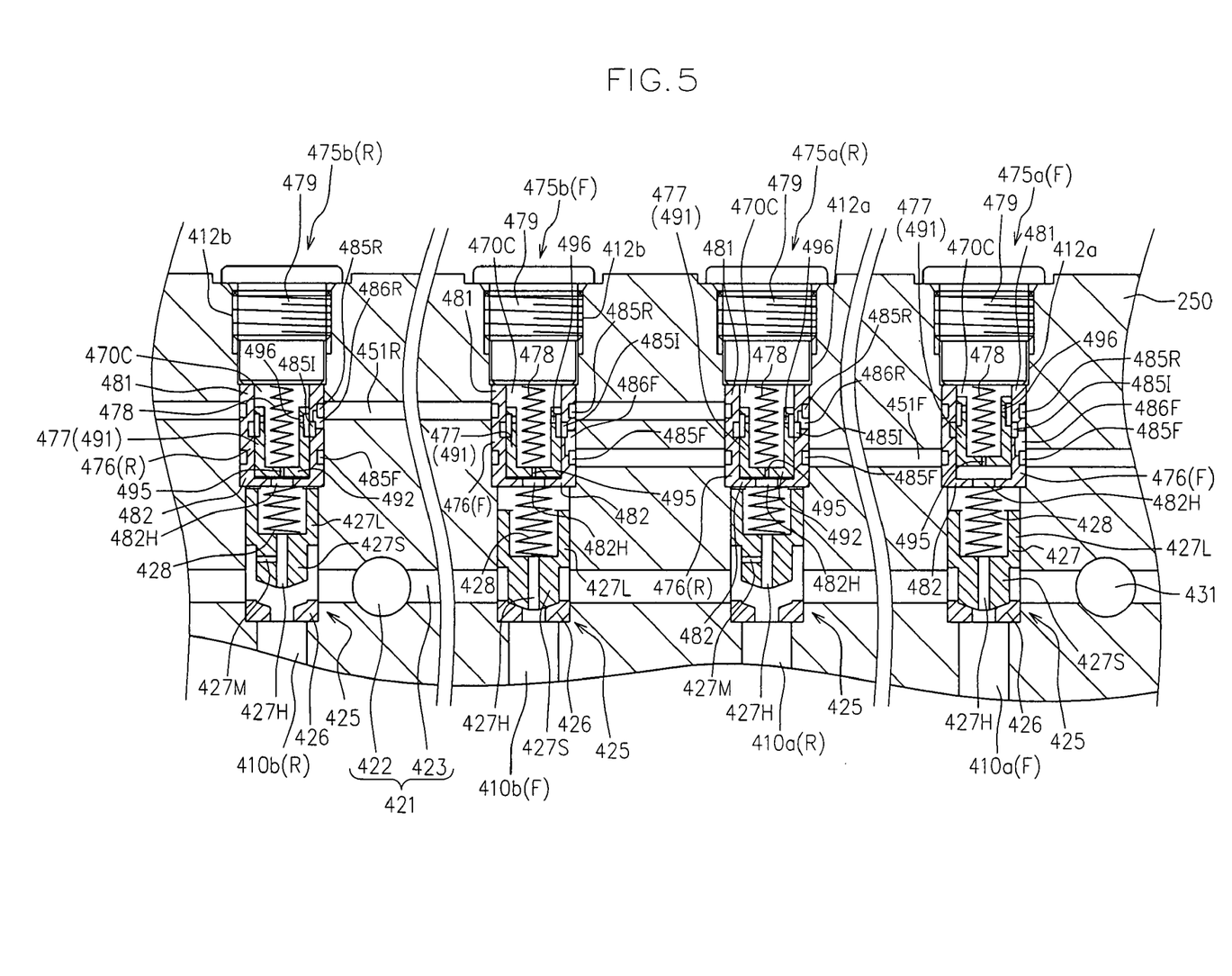
FIG. 5 is an enlarged view of a section circled by a chain double-dashed line V of FIG. 4.

FIG. 5 is an enlarged view of a section circled by a chain double-dashed line V of FIG. 4.

As shown in FIG. 5, the check valve 425 particularly includes: a valve seat member 426 disposed at the inner end of the corresponding mounting hole 412a or 412b; a check valve main member 427 fitted into the corresponding mounting hole 412a or 412b in a slidable manner in an axial direction in such a manner as to be located at a disconnection position, at which the check valve main member 427 is seated on the valve seat member 426, and a connection position, at which the check valve main member 427 is separated from the valve seat member 426; and a check valve urging member 428 for urging the check valve main member 427 toward the valve seat member 426.

The check valve main member 427 includes: a small-diameter portion 427S having a diameter smaller than that of the corresponding mounting hole 412a or 412b, the small-diameter portion 427S being located at a tip (i.e., inward of the mounting hole 412); and a large-diameter portion 427L enlarged in diameter from the small-diameter portion 427S together with a step and extending toward a base end (i.e., outward of the mounting hole 412), the large-diameter portion 427L being slidable in the axial direction in a liquid-tight manner with respect to the mounting hole 412, wherein the step serves as a pressure receiving surface, at which the oil pressure is received from the common oil passage 423.

The check valve urging member 428 is interposed between the check valve main member 427 and a valve case 476 of the constant flow rate valve 475 disposed outward of the mounting hole 412 beyond the check valve main member 427, thereby urging the check valve main member 427 toward the valve seat member 426.

That is to say, in the present preferred embodiment, the valve case 476 of the constant flow rate valve 475 is adapted to engage the base end of the check valve urging member 428.

Incidentally, a through hole 427H is formed at the check valve main member 427, to thus allow a primary side of the check valve main member 427 (i.e., a side, on which the oil pressure of the corresponding operating oil passage 410a or 410b is received) and a secondary side of the check valve main member 427 (i.e., a side, on which the check valve urging member 428 is disposed) to communicate with each other. With the through hole 427H, the oil pressure of the corresponding operating oil passage 410a or 410b acts on the constant flow rate valve 475.

Here, at the check valve main member 427, out of the check valve main members 427, disposed in each of the operating oil passages 410a(R) and 410b(R) on the high pressure side during the rearward travel, an orifice 427M for allowing the corresponding operating oil passage 410a(R) or 410b(R) and the charge oil passage 421 to communicate with each other in a state in which the check valve main member 427 is seated on the valve seat member 426 is formed, thereby enlarging a neutral width of each of the first and second HSTs.

As shown in FIG. 4, the charge relief oil passage 431 is formed in such a manner as to communicate with the branch oil passage 423 on the charge oil passage 421.

As shown in FIG. 4, the first bypass oil passage 441a extends in a direction perpendicular to the pair of first operating oil passages 410a in such a manner as to communicate with one end of each of the first operating oil passages 410a (that is, on the same side as the first operating oil port 411a in reference to the first pump shaft 310a).

In the same manner, the second bypass oil passage 441b extends in a direction perpendicular to the pair of second operating oil passages 410b in such a manner as to communicate with one end of each of the second operating oil passages 410b (that is, on the same side as the second operating oil port 411b in reference to the second pump shaft 310b).

Moreover, the switch valve 445 is interposed in each of the first and second bypass oil passages 441a and 441b in such a manner as to be freely operated outside.

The forward-side straight stable oil passage 451F extends in a direction perpendicular to the operating oil passages 410a and 410b in such a manner as to allow the other ends of the first operating oil passage 410a(F) on the high pressure side during the forward travel and the second operating oil passage 410b(F) on the high pressure side during the forward travel (i.e., ends, at which the mounting holes 412 are formed) to communicate with each other.

In the same manner, the rearward-side straight stable oil passage 451R extends in the direction perpendicular to the operating oil passages 410a and 410b in such a manner as to allow the other ends of the first operating oil passage 410a(R) on the high pressure side during the rearward travel and the second operating oil passage 410b(R) on the high pressure side during the rearward travel to communicate with each other.

Here, in the present preferred embodiment, both of the first operating oil passage 410a(F) and the second operating oil passage 410b(F) on the high pressure side during the forward travel are disposed on the same sides of the corresponding pump shaft 310a or 310b, as viewed along the axial direction of the corresponding pump shaft 310a or 310b. In other words, in FIG. 4, the first operating oil passage 410a(F) is disposed rightward of the corresponding first pump shaft 310a, and the second operating oil passage 410b(F) is disposed rightward of the corresponding second pump shaft 310b.

In this way, when the first and second operating oil passages 410a(F) and 410b(F) on the high pressure side during the forward travel are disposed on the same sides in reference to the corresponding pump shafts 310a and 310b, either one of the first and second operating oil passages 410a(R) and 410b(R) (the first operating oil passage 410a (R) in the preferred embodiment shown in FIG. 4) exists between the first operating oil passage 410a(F) and the second operating oil passage 410b(F) on the high pressure side during the forward travel, and further, either one of the first and second operating oil passages 410a(F) and 410b(F) on the high pressure side during the forward travel (the second operating oil passage 410b(F) in the preferred embodiment shown in FIG. 4) exists between the first operating oil passage 410a(R) and the second operating oil passage 410b(R) on the high pressure side during the rearward travel.

As a consequence, when the forward-side straight stable oil passage 451F is disposed in the direction perpendicular to the first and second operating oil passages 410a(F) and 410b(F) on the high pressure side during the forward travel in such a manner as to allow the first and second operating oil passages 410a(F) and 410b(F) to communicate with each other, the forward-side straight stable oil passage 451F penetrates the operating oil passage on the high pressure side during the rearward travel (the first operating oil passage 410a(R) in FIG. 4) located between the operating oil passages 410a(F).and 410b(F) on the high pressure side during the forward travel.

In the same manner, the rearward-side straight stable oil passage 451R penetrates the operating oil passage on the high pressure side during the forward travel (the second operating oil passage 410b(F) in FIG. 4) located between the first and second operating oil passages 410a(R) and 410b(R) on the high pressure side during the rearward travel.

With regard to this point, in the present preferred embodiment, the constant flow rate valve 475(R), which is disposed on the operating oil passage 410(R) on the high pressure side during the rearward travel located between both of the operating oil passages 410a(F) and 410b(F) on the high pressure side during the forward travel, prevents the forward-side straight stable oil passage 451F from being communicated with the operating oil passage 410(R) located between both of the operating oil passages 410a(F) and 410b(F) while maintaining the communication state of the forward-side straight stable oil passage 451F.

In the same manner, the constant flow rate valve 475(F), which is disposed on the operating oil passage 410(F) on the high pressure side during the forward travel located between both of the operating oil passages 410a(R) and 410b(R) on the high pressure side during the rearward travel, prevents the rearward-side straight stable oil passage 451R from being communicated with the operating oil passage 410(F) located between both of the operating oil passages 410a(R) and 410b(R) while maintaining the communication state of the rearward-side straight stable oil passage 451R.

In particular, as shown in FIGS. 4 and 5, the pump unit 100 in the present preferred embodiment is provided, as the constant flow rate valves, with a first forward-side constant flow rate valve 475a(F) disposed on the first operating oil passage 410a(F) on the high pressure side during the forward travel, a second forward-side constant flow rate valve 475b(F) disposed on the second operating oil passage 410b (F) on the high pressure side during the forward travel, a first rearward-side constant flow rate valve 475a(R) disposed on the first operating oil passage 410a(R) on the high pressure side during the rearward travel, and a second rearward-side constant flow rate valve 475b(R) disposed on the second operating oil passage 410b(R) on the high pressure side during the rearward travel.

As shown in FIG. 5, each of the first and second forward-side constant flow rate valves 475a(F) and 475b(F) includes: a valve case 476(F) liquid-tightly inserted into the mounting hole 412 near the outside in reference to the check valve 425; a valve main body 477 liquid-tightly and slidably accommodated inside of the valve case 476; an urging member 475 for urging the valve main body 477; and a plug member 479 for engaging the base end of urging member 478 and closing an opening end of the mounting hole 412.

Each of the first and second rearward-side constant flow rate valves 475a(R) and 475b(R) has substantially the same configuration as that of the constant flow rate valve 475(F) except that the valve case 476(F) is replaced with a valve case 476(R).

As shown in FIG. 5, each of the valve cases 476(F) and 476(R) is formed into a hollow shape having a peripheral wall 481 in liquid-tight contact with the inner circumferential surface of the mounting hole 412 and an end wall 482 extending between the tips of the peripheral wall 481, thereby defining a pressure retaining chamber 470C in cooperation with the plug member 479.

On the end wall 482 is formed a communicating hole 482H for allowing the communication between a primary side of the constant flow rate valve 475 (i.e., a side, on which the constant flow rate valve 475 communicates with the corresponding operating oil passage 410a or 410b) and a secondary side of the constant flow rate valve 475 (i.e., a side, on which the valve main body 477 is positioned).

On the peripheral wall 481 are formed, at the outer peripheral surface thereof, a forward-side peripheral annular groove 485F corresponding to the forward-side straight stable oil passage 451F and a rearward-side peripheral annular groove 485R corresponding to the rearward-side straight stable oil passage 451R, and further, at the inner circumferential surface thereof, an inner circumferential groove 485I.

Moreover, on the peripheral wall 481 of the valve case 476(F) in each of the forward-side constant flow rate valves 475a(F) and 475b(F) is formed a forward-side communicating hole 486F for allowing the communication between the forward-side peripheral annular groove 485F and the inner circumferential groove 485I.

In contrast, on the peripheral wall 481 of the valve case 476(R) in each of the rearward-side constant flow rate valves 475a(R) and 475b(R) is formed a rearward-side communicating hole 486R for allowing the communication between the rearward-side peripheral annular groove 485R and the inner circumferential groove 485I.

The valve main body 477 of the constant flow rate valve 475 is liquid-tightly contained in a hollow portion in the corresponding valve case 476(F) or 476(R) in a slidable manner in the axial direction.

Specifically, the valve main body 477 is formed into a hollow shape having a peripheral wall 491 in liquid-tight contact with the inner circumferential surface of the valve case 476 and an end wall 492 extending between the tips of the peripheral wall 491.

On the end wall 492 is formed an orifice channel 495 for allowing the communication between the communicating hole 482H formed at the valve case 476 and the pressure retaining chamber 470C.

On the peripheral wall 491 is formed an orifice groove 496 extending between an inner circumferential surface and an outer peripheral surface.

The orifice groove 496 is designed to act as a variable orifice for varying a communication width or cutting off the communication between the inner circumferential groove 485I and the pressure retaining chamber 470C according to a position of the valve main body 477 relatively to the valve case 476.

That is to say, in the case where a difference between an oil pressure on the primary side of the constant flow rate valve 475 (i.e., an oil pressure on the corresponding operating oil passage 410) and an oil pressure on the secondary side of the constant flow rate valve 475 (i.e., an oil pressure in the pressure retaining chamber 470C) in reference to the orifice channel 495 is less than the urging force of the urging member 478, the valve main body 477 is positioned at an initial position, at which the valve main body 477 abuts against the end wall 495 of the valve case 476, by the urging force of the urging member 478 (see the second forward-side constant flow rate valve 475b(F), the first rearward-side constant flow rate valve 475a(R) and the second rearward-side constant flow rate valve 475b(R) in FIG. 5).

The orifice groove 496 is disposed such that the width of the communication with the inner circumferential groove 485I becomes maximum when the valve main body 477 is positioned at the initial position.

In contrast, in the case where the oil pressure on the primary side of the constant flow rate valve is increased, and therefore, the difference between the oil pressure on the primary side and the oil pressure on the secondary side exceeds the urging force of the urging member, the valve main body is pushed in a direction separated from the end wall of the valve case against the urging force of the urging member by the oil pressure on the primary side.

In this manner, the orifice groove 496 is disposed such that the width of the communication with the inner circumferential groove 485I according to the movement distance of the valve main body when the valve main body is pushed by the oil pressure on the primary side (see the first forward-side constant flow rate valve 475a(F) in FIG. 5).

Incidentally, when the width of the communication between the orifice groove 496 and the inner circumferential groove 485I becomes narrow according to the increase in oil pressure on the primary side, a quantity of the oil flowing from the pressure retaining chamber 470C is limited. As a result, the oil pressure on the secondary side (i.e., in the pressure retaining chamber 470C) starts to be increased. When the oil pressure on the secondary side is increased till the difference between the oil pressure on the primary side and the oil pressure on the secondary side becomes smaller than the urging force of the urging member 478, the valve main body 477 is returned to the initial position, so that the width of the communication between the orifice groove 496 and the inner circumferential groove 485I becomes maximum.

The constant flow rate valves 475a and 475b having the above-described configuration act as follows.

Figure 6:
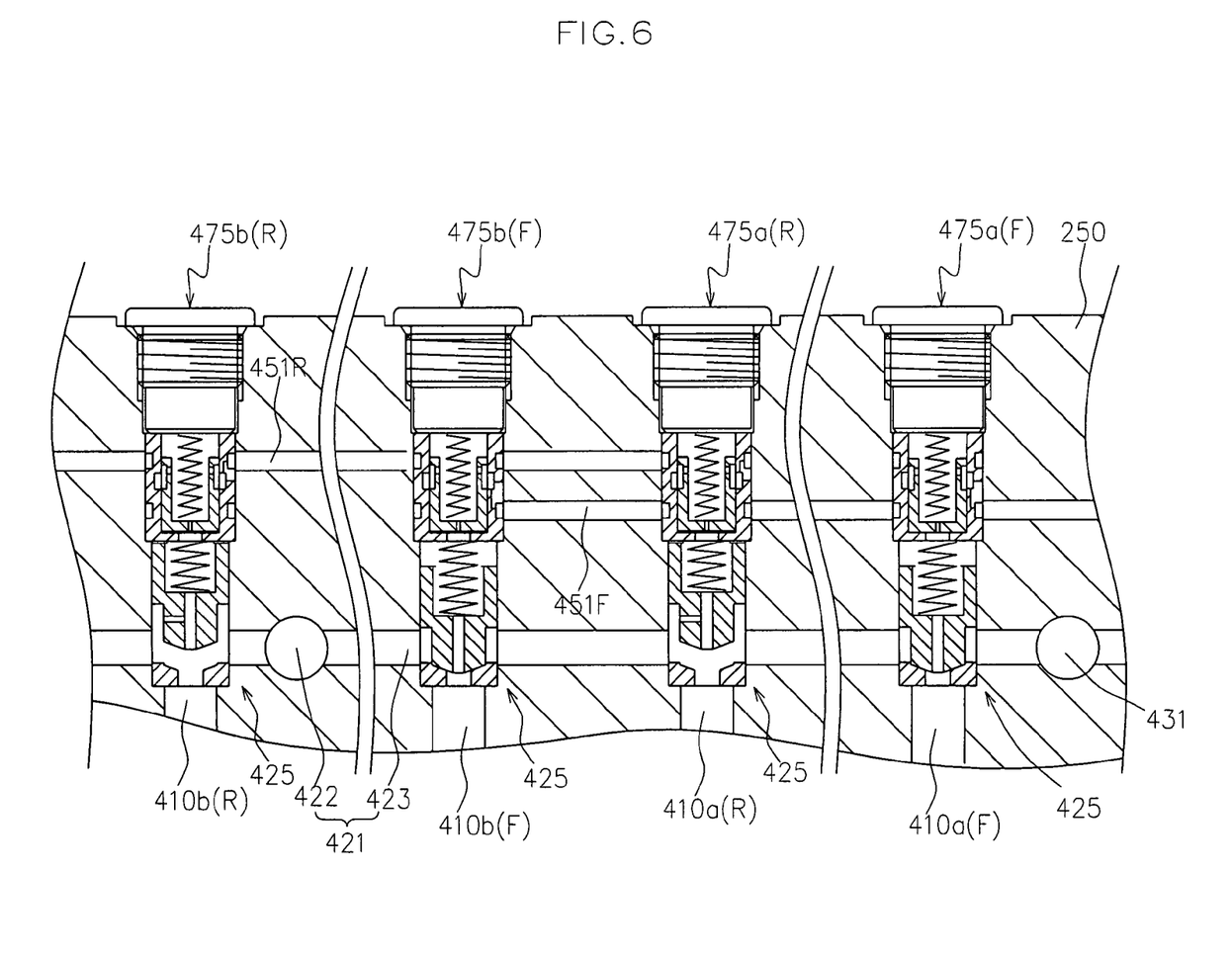
FIG. 6 is an enlarged view of a section circled by a chain double-dashed line V of FIG. 4 in a state where valve main bodies of all constant flow rate valves are positioned at initial positions.

In the case where the difference in oil pressure occurs between the first and second operating oil passages 410a(F) and 410b(F) on the high pressure side during the forward travel in spite of the operation of the first and second movable swash plates 340a and 340b in such a manner that the first and second HSTs are turned into the same output state when a vehicle travels forward, the valve main body 477 in each of the first and second forward-side constant flow rate valves 475a(F) and 475b(F) is positioned at the initial position if the difference in oil pressure between the first and second operating oil passages 410a(F) and 410b(F) is smaller than the urging force of the urging member 478 in the constant flow rate valve 475 (in a state shown in FIG. 6).

In such a state that the variable orifice is in a maximum communication state, the first and second operating oil passages 410a(F) and 410b(F) on the high pressure side during the forward travel are communicated with each other via the orifice channel 495, the orifice groove 496, the inner circumferential groove 485I, the forward-side communicating hole 486F and the forward-side peripheral annular groove 485F in the first forward-side constant flow rate valve 475a(F), the forward-side straight stable oil passage 451F, the forward-side peripheral groove 485F in the rearward-side constant flow rate valve (i.e., the first rearward-side constant flow rate valve 475a(R) in the this embodiment) disposed on the operating oil passage on the high pressure side during the rearward travel interposed between the first and second operating oil passages 410a(F) and 410b(F), and the orifice channel 495, the orifice groove 496, the inner circumferential groove 485I, the forward-side communicating hole 486F and the forward-side peripheral annular groove 485F in the second forward-side constant flow rate valve 475b(F).

Thus, the difference in oil pressure between the first and second operating oil passages 410a(F) and 410b(F) on the high pressure side during the forward travel, which occurs against a person's will, can be eliminated, thereby preventing or alleviating the wandering phenomenon, in which the vehicle wanders in spite of the operation of the first and second movable swash plates 340a and 340b in such a manner that the first and second HSTs are turned into the same state.

Next, a description will be given below of the case where the difference in oil pressure between the first and second operating oil passages 410a(F) and 410b(F) on the high pressure side during the forward travel becomes larger than the urging force of the urging member 478 in the constant flow rate valve 475 irrespective of a vehicle straight operation. In this embodiment, the case where the oil pressure on the first operating oil passage 410a(F) on the high pressure side during the forward travel becomes larger than the oil pressure on the second operating oil passage 410b(F) on the high pressure side during the forward travel is taken as an example.

In this state, the valve main body 477 in the first forward-side constant flow rate valve 475a(F) is first pushed from the initial position by the oil pressure on the first operating oil passage 410a(F). As a consequence, the opening width of the variable orifice in the first forward-side constant flow rate valve 475a(F), that is, the width of the communication between the first operating oil passage 410a(F) and the second operating oil passage 410b(F) becomes narrow (in a state shown in FIG. 5).

Thereafter, as the oil pressure in the pressure retaining chamber 470C in the first forward-side constant flow rate valve 475a(F) is gradually increased via the orifice channel 495 at the valve main body 477 in the first forward-side constant flow rate valve 475a(F), the valve main body 477 starts to be moved toward the initial position accordingly. As a consequence, the opening width of the variable orifice in the first forward-side constant flow rate valve 475a(F), that is, the width of the communication between the first operating oil passage 410a(F) and the second operating oil passage 410b(F) becomes great.

And then, as the oil pressure in the pressure retaining chamber 470C in the first forward-side constant flow rate valve 475a(F) is decreased according to the oil flow from the first operating oil passage 410a(F) to the second operating oil passage 410b(F), the valve main body 477 in the first forward-side constant flow rate valve 475a(F) is pushed toward the initial position.

As described above, according to the axial movement of the valve main body 477 in the first forward-side constant flow rate valve 475a(F) proportional to the oil pressure on the first operating oil passage 410a(F), the width of the communication between the first and second operating oil passages 410a(F) and 410b(R) becomes narrow in the case where the difference in oil pressure between both the first and second operating oil passages 410a(F) and 410b(F) is large, and the width of the communication between both of the oil passages becomes large in the case where the difference in oil pressure is small. That is to say, when the difference in oil pressure between the first and second operating oil passages 410a(F) and 410b(F) becomes a predetermined value or higher, the quantity of the oil flowing from the first operating oil passage 410a(F) to the second operating oil passage 410b(F) can be kept to be substantially constant.

Thus, the difference in oil pressure between the first and second operating oil passages 410a(F) and 410b(F) occurred by disturbance can be, eliminated by the flow of the operating oil in an appropriate quantity, thereby enhancing straight stability.

In addition, although the difference in oil pressure between the first and second operating oil passages 410a(F) and 410b(F) becomes large when the vehicle is turned, the quantity of the flowing oil never exceeds the predetermined value since the width of the communication between both of the oil passages becomes narrow in the case where the difference in oil pressure between the oil passages is large, as described above, thereby preventing any degradation of turnability.

In particular, although the difference in oil pressure between the first and second operating oil passages on the high pressure side, which occurs against a person's will during the vehicle straight operation, is mostly small, the variable orifice ensures an effective quantity of the flowing oil even in the case where the difference in oil pressure between the operating oil passages is small in the pump unit 100 in the present preferred embodiment, as described above. Thus, it is possible to eliminate the wandering of the vehicle against a person's will as speedily as possible.

Additionally, although the difference in oil pressure between the first and second operating oil passages on the high pressure side is large during the vehicle turning operation, the variable orifice keeps the constant quantity of the flowing oil when the difference in oil pressure is larger than the predetermined value in the pump unit 100 in the present preferred embodiment. Thus, even if the difference in oil pressure between the first and second operating oil passages on the high pressure side is large during the vehicle turning operation, a leakage (i.e., the oil flow) to such an extent as to degrade the turnability is not generated.

Moreover, a pressure on each of the first and second operating oil passages 410a(R) and 410b(R) on the high pressure side during the rearward travel is low when the vehicle travels forward.

Thus, the first and second operating oil passages 410a(R) and 410b(R) communicate with each other in the state in which the variable orifice in the first and second rearward-side constant flow rate valves 475(R) are in the maximum communication state, thereby securely eliminating the difference in oil pressure between the oil passages.

The operating oil passage on the high pressure side during the rearward travel (the first operating oil passage 410a(R) in the preferred embodiment) interposed between the first and second operating oil passages 410a(F) and 410b(F) on the high pressure side during the forward travel is disconnected from the forward-side straight stable oil passage 451F by the valve case 476(R) in the first rearward-side constant flow rate valve 475a(R) disposed on the first operating oil passage 410a(R).

Thus, the differences in oil pressure between the operating oil passages 410a(F) and 410b(F) on the high pressure side during the forward travel and the operating oil passages 410a(R) and 410b(R) on the high pressure side during the rearward travel can be secured.

Furthermore, in the case where the difference in oil pressure between the first and second operating oil passages 410a(R) and 410b(R) occurs in the straight operation during the vehicle rearward travel, the valve main body 477 in the first and second rearward-side constant flow rate valves 475a(R) and 475b(R) reciprocates in the same manner, thereby smoothly eliminating the difference in oil pressure between the first and second operating oil passages 410a(R) and 410b(R).

Figure 7:
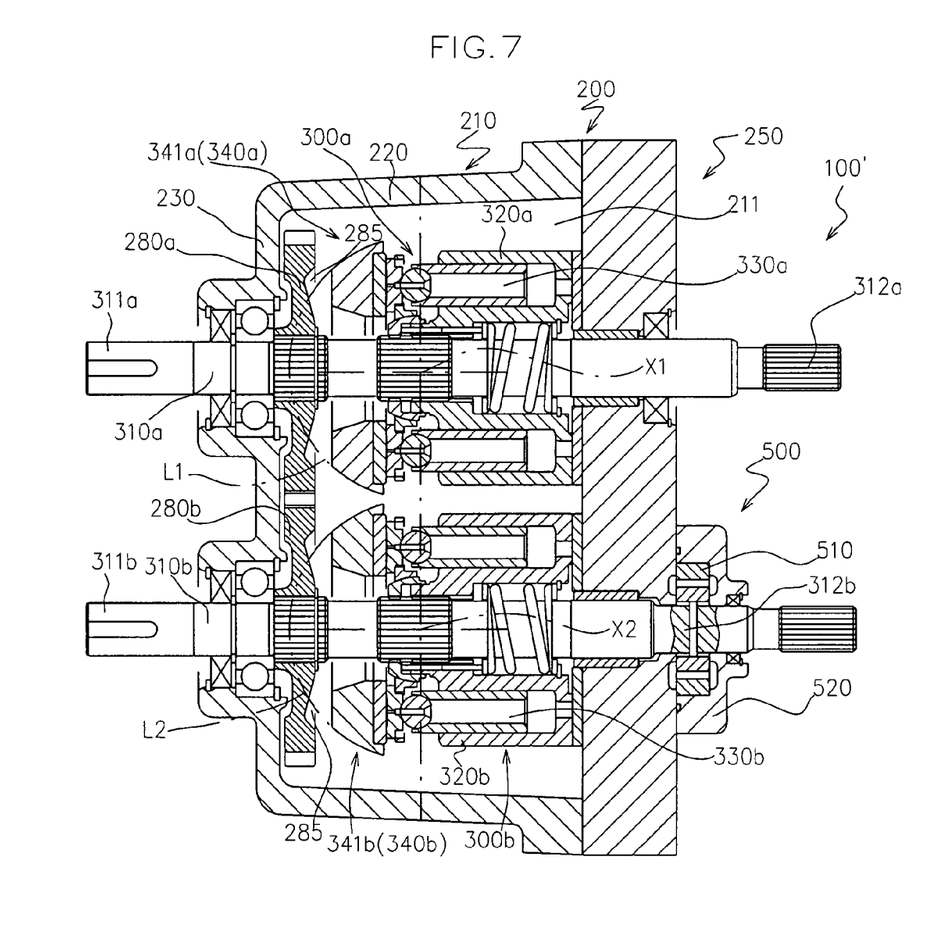
FIG. 7 is a laterally plan view of a modified pump unit of the first embodiment.

Incidentally, although the other end 312b of the second pump shaft, 310b for driving the charge pump main body 510 has been ended inside of the charge pump case 520 (see FIG. 2) in the present preferred embodiment, the other end 312b of the second pump shaft 310b, of course, may project outward of the charge pump case 520 (see FIG. 7).

In a pump unit 100' shown in FIG. 7, the other end 312b of the second pump shaft 310b can be utilized as an output end for driving a driven member such as a cooling fan in addition to the other end 311a of the first pump shaft 310a and one end 311b of the second pump shaft 310b.

Second Embodiment

Hereinafter, a description will be given of a pump unit in another preferred embodiment according to the present invention in reference to the accompanying drawings.

Figure 8:
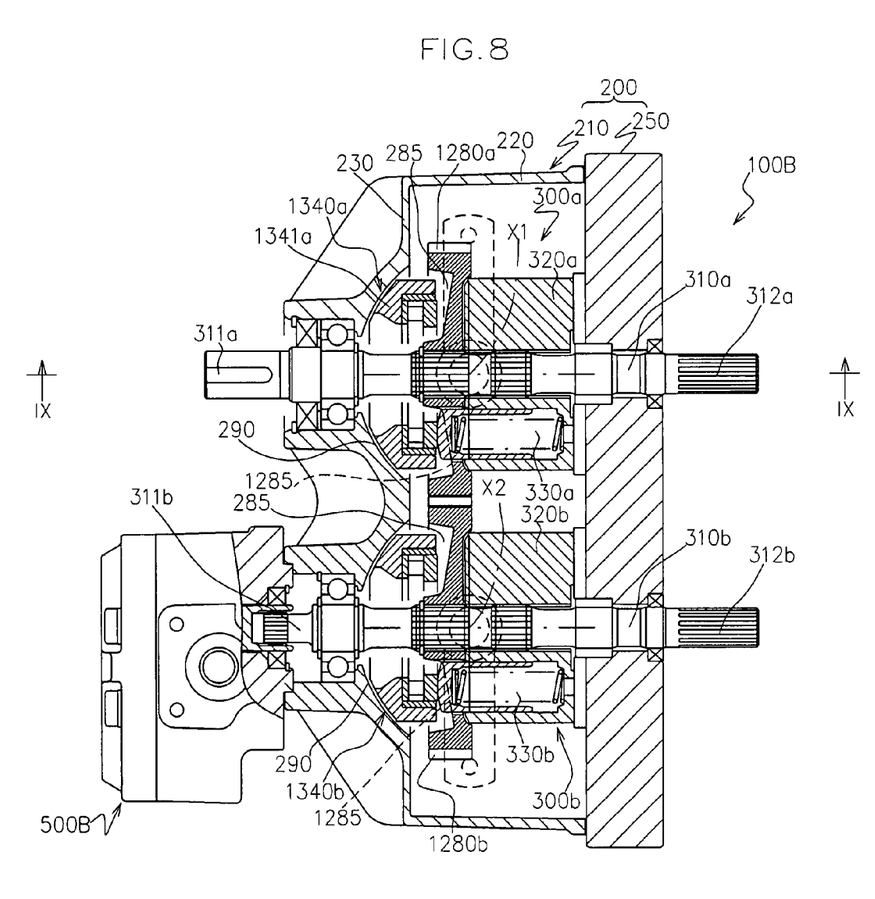
FIG. 8 is a laterally plan view of a pump unit of a second embodiment of the present invention.

FIG. 8 is a laterally plan view of a pump unit 100B in the present preferred embodiment.

Figure 9:
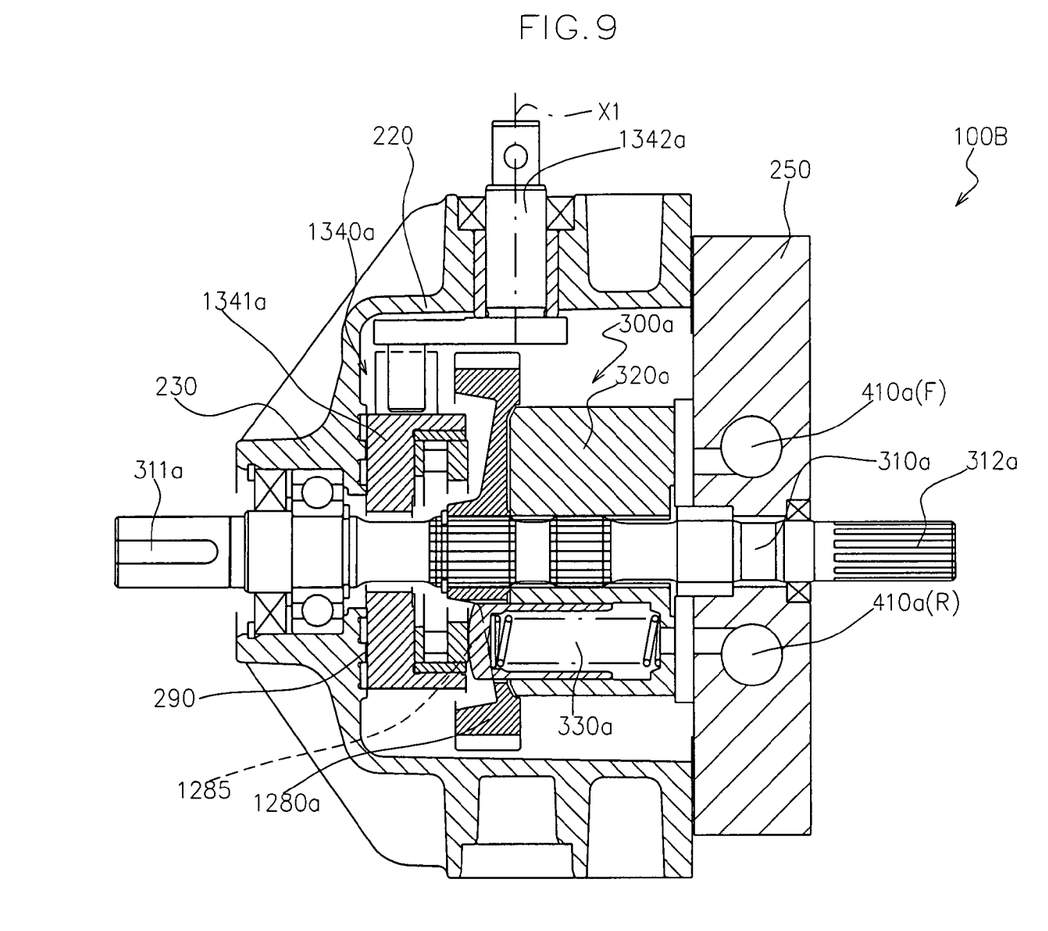
FIG. 9 is a vertically side view of the pump unit, taken along a line IX—IX of FIG. 8.

Furthermore, FIG. 9 is a vertically side view of the pump unit 100B, taken along a line IX—IX of FIG. 8.

As shown in FIGS. 8 and 9, the pump unit 100B has substantially the same configuration as that of the pump unit 100 in the first preferred embodiment except that there are provided cradle type first and second movable swash plates 1340a and 1340b in place of the trunnion type first and second movable swash plates 340a and 340b and first and second transmission gears 1280a and 1280b in place of the first and second transmission gears 280a and 280b.

So, the same and corresponding members as and to those in the pump unit 100 in the first preferred embodiment are designated by the same reference numerals in the drawings, and therefore, the detailed description will be omitted below.

As shown in FIGS. 8 and 9, the cradle type first and second movable swash plates 1340a and 1340b are supported by the pump case 200 in a cantilever manner.

More particularly, the first and second movable swash plates 1340a and 1340b integrally include: swash plate portions 1341a and 1341b inserted around corresponding pump shafts 310a and 310b in such a manner that one end surface forms an abutment surface in abutment against each of piston units 330a and 330b; and operating shaft portions 1342a and 1342b supported on a peripheral wall 220 of the case main body 210 in a relatively rotatable manner on an axis in such a manner as to be positioned on corresponding operational axes X1 and X2 and extend outward at the outer end thereof.

Each of the cradle type first and second movable swash plates 1340a and 1340b needs a recessed arcuate swash plate receiving portion 290 for supporting, in a slide-contact manner, the reverse surface of each of the swash plate portions 1341a and 1341b formed into a projecting arcuate shape.

As a consequence, the cradle type first and second movable swash plates 1340a and 1340b are arranged nearest the end wall 230 of the case main body 210, so that the swash plate receiving portion 290 is formed at an inner circumferential surface on the end wall 230 in the present preferred embodiment.

Incidentally, although the swash plate receiving portion 290 has been formed integrally with the end wall 230 of the case main body 210 in the present preferred embodiment, the swash plate receiving portion 290 may be, of course, formed separately from the case main body 210.

In the case where the swash plate receiving portion 290 is formed separately from the case main body 210, the pump unit 100B may be configured such that both of end surfaces of the case main body 210 are opened, so that both of the openings may be liquid-tightly closed by the plate member 250 and a member constituting the swash plate receiving portion 290.

Furthermore, since the swash plate receiving portion 290 is formed on the end wall 230 of the case main body 210 in the pump unit 100B in the present preferred embodiment, the first and second transmission gears 1280a and 1280b are interposed between the corresponding movable swash plates 1340a and 1340b and the corresponding piston units 330a and 330b in axial directions of the corresponding pump shafts 310a and 310b, respectively.

A plurality of through holes 1285 for allowing the corresponding piston units 330a and 330b to be inserted, are formed at the first and second transmission gears 1280a and 1280b, respectively.

In other words, in the present preferred embodiment, the first piston unit 330a abuts against the abutment surface of the first cradle type movable swash plate 1340a via the through hole 1285 formed at the first transmission gear 1280a, and the second piston unit 330b abuts against the abutment surface of the second cradle type movable swash plate 1340b via the through hole 1285 formed at the second transmission gear 1280b.

The first and second transmission gears 1280a and 1280b have recesses 285 in conformity with oscillation trails of the swash plates 1341a and 1341b at surfaces facing to the swash plate portions 1341a and 1341b of the first and second cradle movable swash plates 1340a and 1340b (i.e., surfaces facing to the abutment surfaces of the swash plate portions 1341a and 1341b of the first and second cradle movable swash plates 1340a and 1340b), respectively.

Also in the pump unit 100B, the corresponding movable swash plate 1340 and transmission gear 280 can be arranged in the proximity with each other with respect to the direction of the pump shaft while allowing the oscillation of the movable swash plates 1340a and 1340b, thereby reducing the size of the pump unit 100B as much as possible, like in the first preferred embodiment.

Here, the pump unit 100B in the present preferred embodiment includes a high-pressure gear pump unit 500B for a working machine in place of the charge pump unit 500. Return oil of discharge oil supplied to a working machine from the high-pressure gear pump unit 500B is designed to be supplied into the charge line 420.

The configuration in which the transmission gears 1280a and 1280b having the through holes 1285 are interposed between the movable swash plates and the corresponding piston units, respectively, which has been described in the present preferred embodiment, is not limited to the cradle type movable swash plates 1340a and 1340b.

For example, the first and second transmission gears 1280a and 1280b having the through holes 1285 may be interposed between the trunnion type movable swash plates 340a and 340b and the corresponding piston units 330a and 330b, respectively, in the pump unit 100 in the first preferred embodiment.

Additionally, although the present invention has been described by way of the dual pump unit, in which the pair of first and second hydraulic pump main bodies 300a and 300b are arranged in parallel to each other, in each of the preferred embodiments, the present invention is not limited to the above-described embodiments.

For example, the present invention is applicable to a single pump unit including: a single pump shaft operatively connected to a driving source; a single hydraulic pump main body to be rotatably driven by the single pump shaft; a single movable swash plate inserted around the single pump shaft in such a manner as to vary a suction/discharge oil quantity of the single hydraulic pump main body; a transmission gear supported by the single pump shaft in a relatively non-rotatable manner in such a manner as to face to the single movable swash plate; and a driven member such as a PTO unit operatively driven by the transmission gear. Alternatively, the present invention is applicable also to a pump unit including three or more hydraulic pump main bodies.

This specification is by no means intended to restrict the present invention to the preferred embodiments set forth therein. Various modifications to the pump unit as described herein, may be made by those skilled in the art without departing from the spirit and scope of the present invention as defined in the appended claims.

What is claimed is:

1. A pump unit comprising:
    a pump shaft operatively connected to a driving source;
    a cylinder block rotatably driven by the pump shaft;
    a piston unit accommodated in the cylinder block in a slidable manner in an axial direction;
    a movable swash plate oscillatable on an operational axis perpendicular to the pump shaft, the movable swash plate defining a slide range of the piston unit in abutment against the piston unit;
    a transmission gear supported by the pump shaft in a relatively non-rotatable manner, the transmission gear being disposed in such a manner as to face to the movable swash plate;
    a driven member operatively driven by the transmission gear; and
    a pump case supporting the pump shaft and accommodating therein the cylinder block, the piston unit, the movable swash plate, the transmission gear and the driven member;
    wherein the transmission gear has a recess in conformity with an oscillation trail of the movable swash plate at a surface facing to the movable swash plate.

2. A pump unit comprising:
    first and second pump shafts;
    first and second cylinder blocks rotatably driven by the first and second pump shafts, respectively;
    first and second piston units accommodated in the first and second cylinder blocks, respectively, in a slidable manner in an axial direction;
    first and second movable swash plates oscillatable on first and second operational axes perpendicular to the first and second pump shafts, respectively, the first and second movable swash plates defining slide ranges of the first and second piston units in abutment against the first and second piston units, respectively;
    a first transmission gear supported by the first pump shaft in a relatively non-rotatable manner, the first transmission gear being disposed in such a manner as to face to the first movable swash plate;
    a second transmission gear supported by the second pump shaft in a relatively non-rotatable manner in a state driven in synchronism with the first transmission gear, the second transmission gear being disposed in such a manner as to face to the second movable swash plate; and
    a pump case supporting the first and second pump shafts and accommodating therein the first and second cylinder blocks, the first and second piston units and the first and second transmission gears;
    wherein each of the first and second transmission gears has a recess in conformity with an oscillation trail of each of the first and second movable swash plates at a surface facing to the corresponding movable swash plate.

3. The pump unit according to claim 2, wherein each of the first and second movable swash plates is of a trunnion type;
    the first transmission gear, the first movable swash plate, the first piston unit are arranged in order along the first pump shaft; and
    the second transmission gear, the second movable swash plate, the second piston unit are arranged in order along the second pump shaft.

4. The pump unit according to claim 2, wherein each of the first and second movable swash plates is of a cradle type;
    the first transmission gear is interposed between the first movable swash plate and the first piston unit in the axial direction of the first pump shaft;
    the second transmission gear is interposed between the second movable swash plate and the second piston unit in the axial direction of the second pump shaft; and
    each of the first and second transmission gears has a through hole, into which the corresponding piston unit can be inserted.

5. The pump unit according to claim 4, wherein the pump case includes: a case main body having an opening, into which each of the first and second cylinder blocks can be inserted; and a plate member detachably connected to the case main body in such a manner as to liquid-tightly close the opening, the plate member has a suction/discharge oil passage to be fluidly communicated with the cylinder block; and
    the pump case has a swash plate receiving portion at an end surface on a side opposite to the opening.

6. The pump unit according to claim 2, wherein each of the first and second pump shafts projects outward from the pump case at both ends thereof, and
    either one of the ends forms an input end operatively connected to a driving source while the residual end form output ends for driving driven members.

* * * * *